United States Patent [19]

Walter et al.

[11] Patent Number: 4,562,860
[45] Date of Patent: Jan. 7, 1986

[54] BALL VALVE HAVING EASY MAINTENANCE FEATURES FOR EXTREME ENVIRONMENTS

[75] Inventors: John F. Walter, North Kingstown; Bruce M. Costa, Little Compton; Harry E. Eminger, East Greenwich, all of R.I.

[73] Assignees: Wilmington Trust Company; William J. Wade, both of Wilmington, Del.

[21] Appl. No.: 511,365

[22] Filed: Jul. 6, 1983

[51] Int. Cl.⁴ ............................................. F16K 25/00
[52] U.S. Cl. ................................. 137/454.6; 251/174; 251/315; 251/317
[58] Field of Search .................. 137/454.2, 454.6; 251/174, 315, 317

[56] References Cited

U.S. PATENT DOCUMENTS

| | | | |
|---|---|---|---|
| 2,936,778 | 5/1960 | Stillwagon | 137/454.6 |
| 3,095,898 | 7/1963 | Freeman | 137/454.2 |
| 3,132,836 | 5/1964 | Dickerson | 137/454.6 X |
| 3,150,681 | 9/1964 | Hansen | 137/454.2 |
| 3,179,121 | 4/1965 | Bredtschneider | 137/454.6 |
| 3,194,259 | 7/1965 | Garrod | 137/454.2 |
| 3,306,315 | 2/1967 | Cook | 251/174 X |
| 4,111,393 | 9/1978 | McClurg | 251/174 |
| 4,460,012 | 7/1984 | Koumi | 137/454.6 |

Primary Examiner—Harold W. Weakley
Attorney, Agent, or Firm—Kenway & Jenney

[57] ABSTRACT

A valve assembly is provided which is particularly suitable for operation and maintenance under extreme environments. It includes a valve body, a ball valve member rotatably mounted within the valve body, a bonnet removably secured to the valve body, and seat retaining asemblies removably secured to the bonnet. Upon removal of the bonnet, the valve member and all internals are also removed as a unit so that they may be serviced at a convenient location. The seat retaining assemblies may include inclined surfaces which seat against oppositely inclined surfaces defined within the valve body. An alignment plate is secured to the seat retaining assemblies to insure proper sealing.

2 Claims, 4 Drawing Figures 4,562,860

BALL VALVE HAVING EASY MAINTENANCE FEATURES FOR EXTREME ENVIRONMENTS

BACKGROUND OF THE INVENTION

1. Field of the Invention

The field of the invention relates to a ball valve assembly wherein the entire valve internals can be removed easily for service even under extreme environments.

2. Brief Description of the Prior Art

Valves in remote locations or in environments where human access is limited have been extremely difficult to maintain. Examples of such locations include the ocean floor and arctic areas. Ball valves are commonly used in pipelines because they provide a through conduit. However, they are particularly difficult to disassemble and reassemble when positioned, for example, on the ocean floor. Typically, such a valve would require a diver to remove the bonnet attached to the housing, disconnect the internal elements such as seats, remove the disc from the valve, and thereafter remove other internals. Each of these steps require tool manipulation, crane manipulation, and complex communications, U.S. Pat. No. 3,891,183 is an example of a ball valve which provides successful flow regulation and is assembled and disassembled in a well-known manner.

SUMMARY OF THE INVENTION

The invention provides a ball valve assembly including a housing, a valve member within the housing, a bonnet secured to the housing, and a valve seating assembly and other internal members secured to the bonnet. The valve member is preferably a double-trunnion ball. By removing the bolts or other members which secure the bonnet to the housing, and attaching an eye bolt or the like to the top of a trunnion, the entire valve internals can be lifted from the housing and taken to a more hospitable environment for servicing. The reassembled internals would be lowered, guided into the valve, and the bonnet bolts replaced.

In a preferred embodiment of the invention, a tapered or wedge-shaped seat retainer assembly is bolted to the bonnet. A valve seat is maintained in sealing engagement with a ball-shaped valve member. When the bonnet is removed from the valve body, the seat retainer assembly and the valve member are also removed in one easy step.

DETAILED DESCRIPTION OF THE INVENTION

Figure 1:
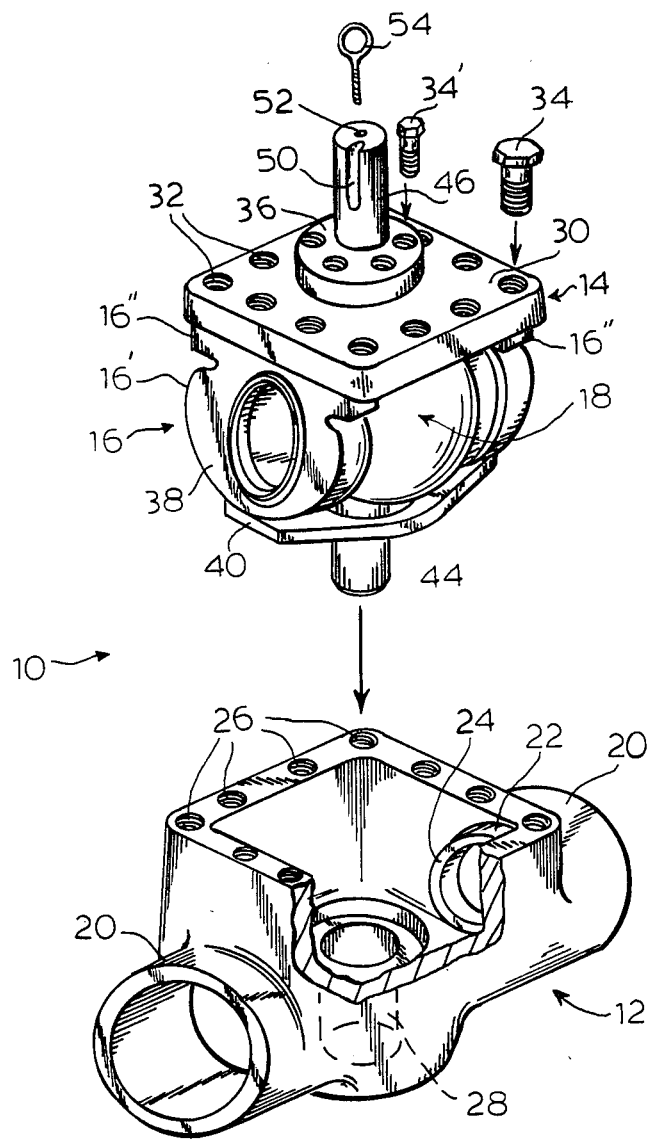
FIG. 1 is an exploded perspective view of a seat assembly retainer and a valve body according to the present invention.
Figure 2:
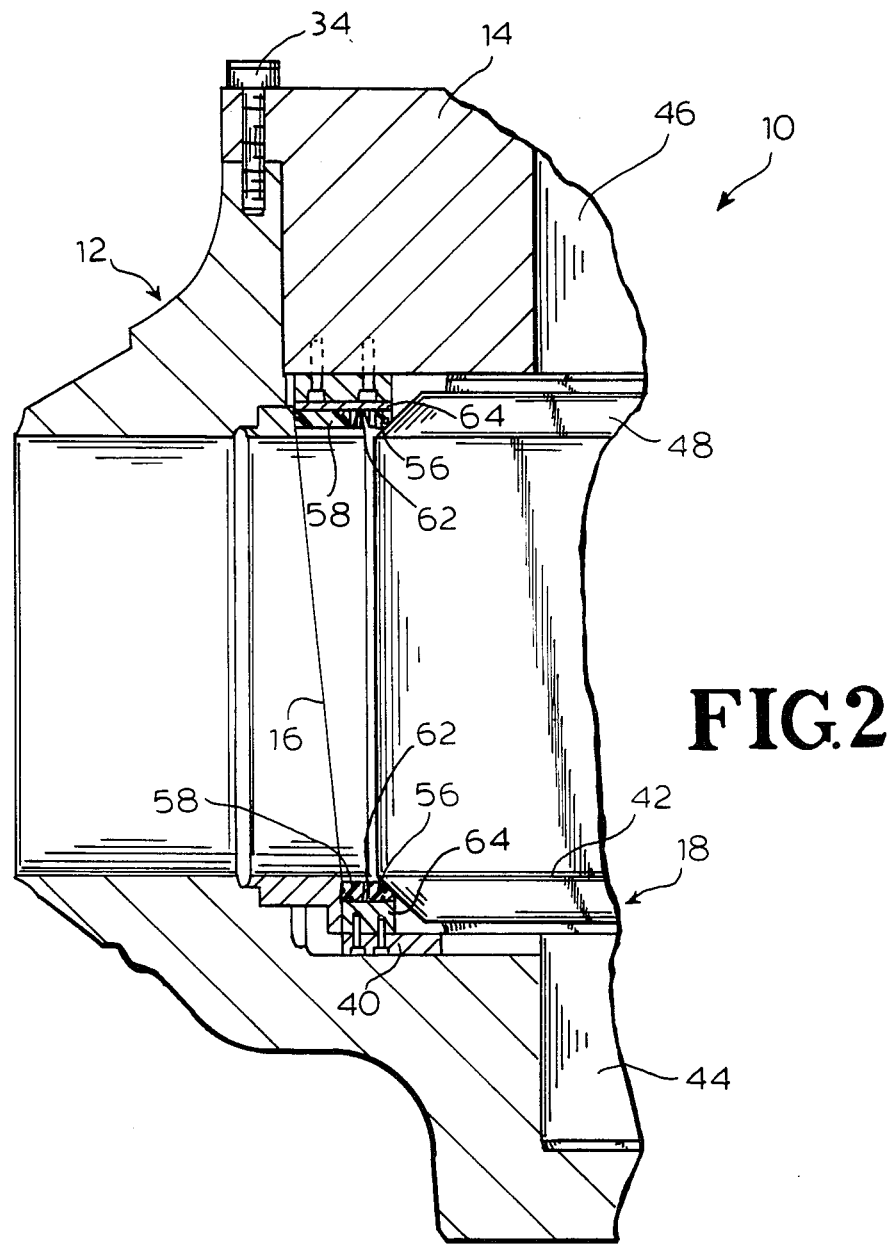
FIG. 2 is a partially sectional view of a portion of the seat assembly retainer and valve body shown in FIG. 1.

A valve assembly 10 is disclosed which allows relatively easy maintenance even under extreme environments. The assembly 10 includes a valve body 12, a bonnet 14 which may be bolted to the valve body, a seat retainer assembly 16 removably secured to the bonnet 14, and a valve member 18.

The rectangular or square valve body 12 is a cast or forged structure including a pair of coaxial ports 20. Each of the ports includes an inwardly projecting annular portion 22. Each portion 22 has a tapered or inclined inner face 24 defining a seat ring which protrudes further within the valve body near the bottom thereof. A plurality of threaded holes 26 are provided within the top of valve body 12 for attachment of the bonnet 14. The bottom of the valve body includes a cylindrical chamber 28 for rotatably receiving a lower trunnion of the valve member 18.

The bonnet 14 includes a substantially rectangular or square plate 30 having a plurality of holes 32 about its perimeter for receiving bolts 34. When the bonnet is mounted to the valve body 12, holes 26 and 32 will be aligned. A central opening is provided within plate 30 through which an upper trunnion of the valve member 18 extends. A circular plate 36 is bolted (with bolts 34') to the top surface of the bonnet for maintaining one or more sealing members in position between the upper trunnion and the bonnet. These members may include a plurality of O-rings mounted within polyurethane carriers. Since the trunnion and bonnet may be made from different materials, proper sealing may be necessary to prevent electrolysis. These sealing members are not illustrated in the drawings.

A pair of wedge-shaped seat retaining assemblies 16 are bolted to the bonnet 14. Each retainer includes a substantially circular body portion 16' when viewed from the front or rear. A pair of ears 16" project from the top thereof and provide accessible surfaces through which bolts 37 may be applied for attaching the retainers to the bonnet. The seat retaining assemblies are mounted in opposed relation to each other and present inclined exterior faces 38 which make flush contact with at least a portion of the inner faces 24 of the valve body 12. Each has a central opening aligned with ports 20. A bottom support plate 40 is bolted to the lower surfaces of these assemblies for alignment purposes. It includes a central opening through which a trunnion may pass.

The valve member 18 is a double-trunnion ball having a passage 42 extending therethrough. It includes a lower trunnion 44, an integral upper trunnion 46, and the ball 48. The upper trunnion 46 includes a longitudinal slot 50 which may be used for turning the ball between open and closed positions. A threaded hole 52 extending axially from the top surface of the upper trunnion allows the attachment of an eye bolt 54.

Figure 3:
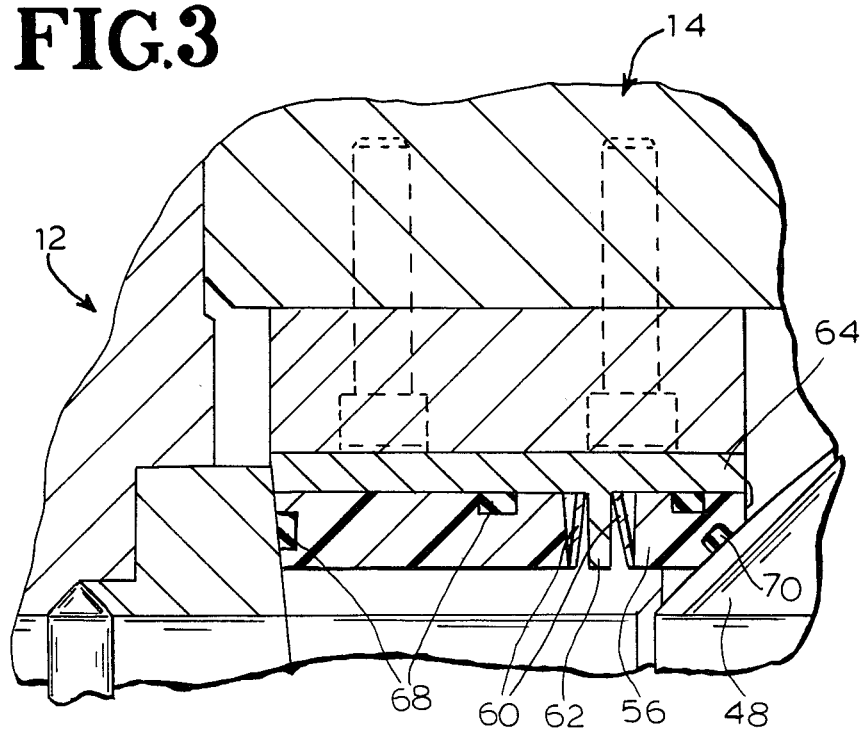
FIG. 3 is an enlarged sectional view illustrating the top portion of the seat assembly retainer and valve body.
Figure 4:
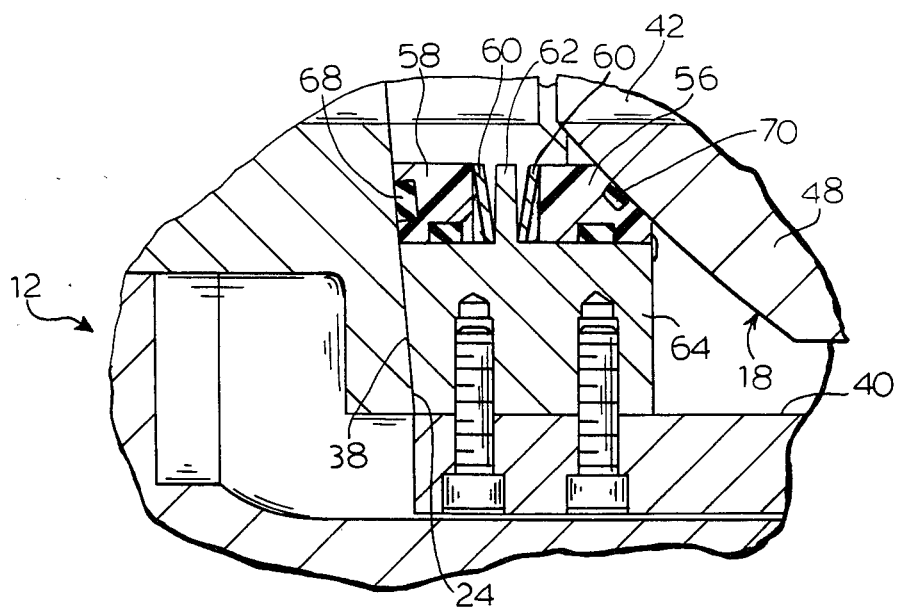
FIG. 4 is an enlarged sectional view of the bottom portion thereof.

The valve seating assembly is best shown in FIGS. 3 and 4. A pair of slidable polyurethane seat retainers 56, 58 are resiliently urged in opposite directions by Belleville washers 60. A spacer 62 extends between the retainers 56,58 from a supporting member 64 which adjoins the outer surfaces thereof. The bottom support plate 40 is bolted to the supporting member 64 by bolts 66. O-rings 68, 70 provide seals between one retainer 56 and the ball 48, the other retainer 58 and the seat ring defined by face 24, and the retainers and supporting member 64. The O-ring 68 between the retainer 58 and face 24 is compressed by the downward force provided by the bonnet when bolted up.

The valve assembly functions as a well-operating ball valve during use. An actuating mechanism (not shown) is connected to the upper turnnion 46 for turning the ball 48 so that the axis of passage 42 is aligned with or perpendicular to the axes of ports 20. If the valve needs to be disassembled for maintenance or repair, the eye bolt 54 is secured to the upper trunnion 46 of the valve member 18 and the bolts 34 securing the bonnet 14 to the valve body 12 are removed. A cable secured to the eye bolt may then be used for lifting the entire valve mechanism, including the bonnet 14, seat retainer assembly 16, valve member 18, and seating assembly 56-70 from the valve body 12. A crane may be employed for raising these parts in one piece from the ocean floor. Once in a more convenient location, the support plate 40 is removed and the seat retainer assemblies 16 unbolted from the bonnet to gain access to the valve internals. Upon replacement or repair of damaged parts, the structure is reassembled and inserted as a unit into the valve body 12. Alternatively, an inventory of replacement valve structures could be maintained so that damaged valves could be immediately replaced. The removed valve could then be repaired when convenient.

What is claimed is:

1. A valve assembly comprising:
   a valve body defining a valve chamber having an upper access opening;
   a ball member rotatably mounted within said valve chamber, said ball member having a passage extending therethrough;
   a bonnet removably secured to said valve body and closing said upper access opening; and
   two opposed seat retaining assemblies removably mounted to said bonnet, each including a body portion having an opening therein and a pair of projecting members extending laterally with respect to said body portion, said projecting members defining top portions of each of said seat retaining assemblies and being bolted to said bonnet, said assemblies further including at least one seat for sealingly engaging said ball member;
   said bonnet, seat retaining assemblies, seat and ball member being arranged such that they are removable as a unit from said valve body upon detachment of said bonnet from said valve body.

2. A valve assembly comprising:
   a substantially rectangular valve body defining a valve chamber, an upper rectangular access opening and a pair of opposed inclined seating surfaces within said valve chamber;
   a double-trunnion ball member rotatably mounted within said valve chamber and having a passage extending therethrough;
   a substantially rectangular bonnet removably secured to an upper surface of said valve body and closing said access opening, said bonnet including a central opening through which one of the trunnions of the ball member extends;
   a pair of opposing seat retaining assemblies removably secured to said bonnet, each including a body portion having an inclined exterior surface in engagement, respectively, with one of said opposing inclined seating surfaces defined by said valve body, a passage therethrough and a pair of projections defining an upper portion thereof, said projections being bolted to said bonnet; and
   seating means slidably mounted to each of said seat retaining assemblies, said seating means each including a first seat retainer resiliently urged against said ball member and a second seat retainer resiliently urged against one of said opposing inclined seating surfaces defined by said valve body;
   said bonnet, seat retaining assemblies, seating means and ball member being removable as a unit upon detachment of said bonnet from said valve body.

* * * * *